United States Patent
Qu (10) Patent No.: US 6,917,361 B2
(45) Date of Patent: Jul. 12, 2005

(54) METHOD AND SYSTEM FOR COMPUTING A TRANSVERSE DERIVATIVE FIELD ALONG A CURVE ON A SURFACE

(75) Inventor: Ruibin Qu, Ann Arbor, MI (US)

(73) Assignee: UGS Corp., Plano, TX (US)

(*) Notice: Subject to any disclaimer, the term of this patent is extended or adjusted under 35 U.S.C. 154(b) by 188 days.

(21) Appl. No.: 10/251,455

(22) Filed: Sep. 19, 2002

(65) Prior Publication Data

US 2004/0056863 A1 Mar. 25, 2004

(51) Int. Cl.$^7$ .................. G09G 5/00; G06T 11/20
(52) U.S. Cl. ............... 345/442; 345/421; 345/586; 345/643
(58) Field of Search ................... 345/442, 443, 345/467–468, 501, 586, 643, 669, 421, 469; 382/258, 201, 202, 203, 316, 323; G06T 11/20; G09G 5/00

(56) References Cited

U.S. PATENT DOCUMENTS

| | | | |
|---|---|---|---|
| 6,483,518 B1 | * 11/2002 | Perry et al. | 345/590 |
| 6,591,004 B1 | * 7/2003 | VanEssen et al. | 382/154 |
| 6,718,291 B1 | * 4/2004 | Shapiro et al. | 703/2 |

OTHER PUBLICATIONS

"NURB Curves: A Guide for the Uninitiated," The Apple Technical Journal, pp 1–21; http://www.devworld.apple.com/dev/techsupport/develop/issue25/schneider.html, Jun. 1, 2002.

* cited by examiner

Primary Examiner—Matthew C. Bella
Assistant Examiner—Wesner Sajous
(74) Attorney, Agent, or Firm—Baker Botts, LLP (57) ABSTRACT

According to one embodiment of the invention, a computerized method for computing a transversal derivative field along a curve on a surface includes receiving data defining the surface, the surface represented in terms of parameters u and v as S(u,v), and receiving data defining the curve, the curve represented in terms of a parameter t as c(t). The method also includes receiving a number equal to N constraint conditions for the derivative field, wherein N is a positive integer and determining the transversal derivative L(t) field according to the formula

$$L(t) = \frac{\partial S(u(t), v(t))}{\partial w},$$

where i is an index identifying a particular one of N numbers of constraint conditions and $L(t_i)$ is the value of the transversal derivative field at the ith constraint condition and w is a scalar function of u and v that satisfies

$$\frac{\partial S(u(t_i), v(t_i))}{\partial w} = L(t_i).$$

31 Claims, 6 Drawing Sheets

METHOD AND SYSTEM FOR COMPUTING A TRANSVERSE DERIVATIVE FIELD ALONG A CURVE ON A SURFACE

TECHNICAL FIELD OF THE INVENTION

This invention relates generally to computer modeling and more particularly to a method for computing a transversal derivative field along a curve on a surface for use in computer modeling.

BACKGROUND OF THE INVENTION

In computer graphics it is often necessary to compute various types of transversal derivative fields along a curve on a specified surface in order to generate other curves and surfaces for use in computer modeling. A transversal derivative field refers to any tangential vector field along the curve that is not parallel to the tangent field of the curve at all of the points on the curve. Doing so is often difficult because of the complexities of the curves and the degrees of freedom involved in the computation.

According to some current methods, computation is point based, which involves estimation of the direction of the derivative field at certain points and then fitting an estimate of the derivative field to those points. A problem with this approach is that it does not generate an optimum solution and the resulting vector field may contain errors. This is due to the fact that this approach does not fully utilize the properties of the surface on which the curve lies.

SUMMARY OF THE INVENTION

According to one embodiment of the invention, a computerized method for computing a transversal derivative field along a curve on a surface includes receiving data defining the surface, the surface represented in terms of parameters u and v as S(u,v), and receiving data defining the curve, the curve represented in terms of a parameter t as c(t). The method also includes receiving a number equal to N constraint conditions $L(t_i)$ for the derivative field, where N is a positive integer, and determining the transversal derivative L(t) field according to the formula $$L(t) = \frac{\partial s(u(t), v(t))}{\partial w},$$

where i is an index identifying a particular one of N numbers of constraint conditions and $L(t_i)$ is the value of the transversal derivative field at the ith constraint condition and w is a scalar function of u and v that satisfies $$\frac{\partial s(u(t_1), v(t_1))}{\partial w} = L(t_1).$$

Some embodiments of the invention provide numerous technical advantages. Some embodiments may benefit from some, none, or all of these advantages. For example, in one embodiment of the invention, a transversal derivative field may be calculated that is more accurate than conventional methods because the properties of the surface are utilized, rather than basing the transversal derivative field on only particular points and then estimating the transversal derivative field. According to one embodiment, this method may be calculated in an efficient manner along the reduced computational requirements.

Other technical advantages may be readily ascertained by one of skill in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF THE INVENTION

Embodiments of the invention are best understood by referring to FIGS. 1A through 6E of the drawings, like numerals being used for like and corresponding parts of the various drawings.

Figure 1A:
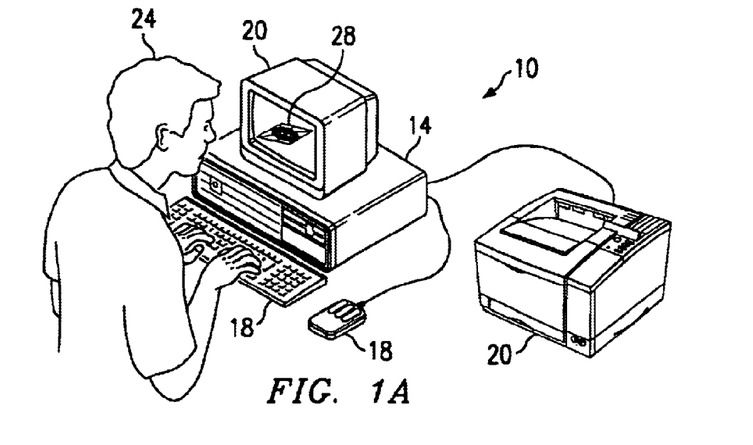
FIG. 1A is a schematic diagram showing a computer system that may benefit from the teachings of the invention.

FIG. 1A is a schematic diagram illustrating an embodiment of a computer system 10 for computer modeling that may benefit from the teachings of the present invention. System 10 includes a computer 14 that is coupled to one or more input devices 18 and one or more output devices 20. A user 24 has access to system 10 and may utilize input devices 18 to input data and generate and edit a model 28 that may be displayed by any or all of output devices 20.

As shown in FIG. 1A, examples of input device 18 are a keyboard and a mouse; however, input device 18 may take other forms, including a stylus, a scanner, or any combination thereof. Examples of output devices 20 are a monitor and a printer; however, output device 16 may take other forms, including a plotter. Any suitable visual display unit, such as a liquid crystal display ("LCD") or cathode ray tube ("CRT") display, that allows user 24 to view model 28 may be a suitable output device 20.

Figure 1B:
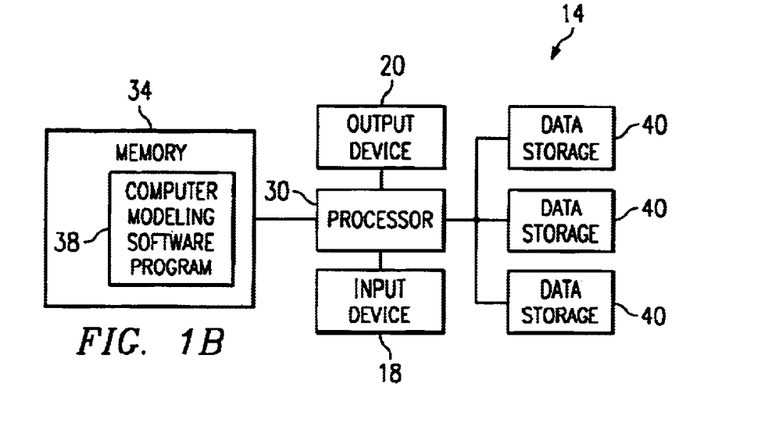
FIG. 1B is a block diagram of the computer system of FIG. 1A.

FIG. 1B is a block diagram of computer 14 for use in performing computer modeling according to one embodiment of the present invention. As illustrated, computer 14 includes a processor 30 and memory 34 storing computer modeling software program 38. Computer 14 also includes one or more data storage units 40 for storing data related to computer modeling software program 38 or other data.

Processor 30 is coupled to memory 34 and data storage unit 40. Processor 30 is operable to execute the logic of computer modeling software 38 and access data storage unit 40 to retrieve or store data relating to the computer modeling. Examples of processor 30 are the Pentium series processors, available from Intel Corporation.

Memory 34 and data storage unit 40 may comprise files, stacks, databases, or other suitable forms of data. Memory 34 and data storage unit 40 may be random-access memory, read-only memory, CD-ROM, removable memory devices or other suitable devices that allow storage and/or retrieval of data. Memory 34 and data storage unit 40 may be interchangeable and may perform the same functions.

Computer modeling software program 38 is a computer program that allows user 18 to model a device using computer 14. Computer modeling software program 38 may be part of a drawing application, such as a computer aided drafting package, or exist as an independent computer application. Computer modeling software program 38 may reside in any storage medium, such as memory 34 or data storage unit 40. Computer modeling software program 38 may be written in any suitable computer language, including C, C++, C#, Java and J++.

Figures 2, 3:
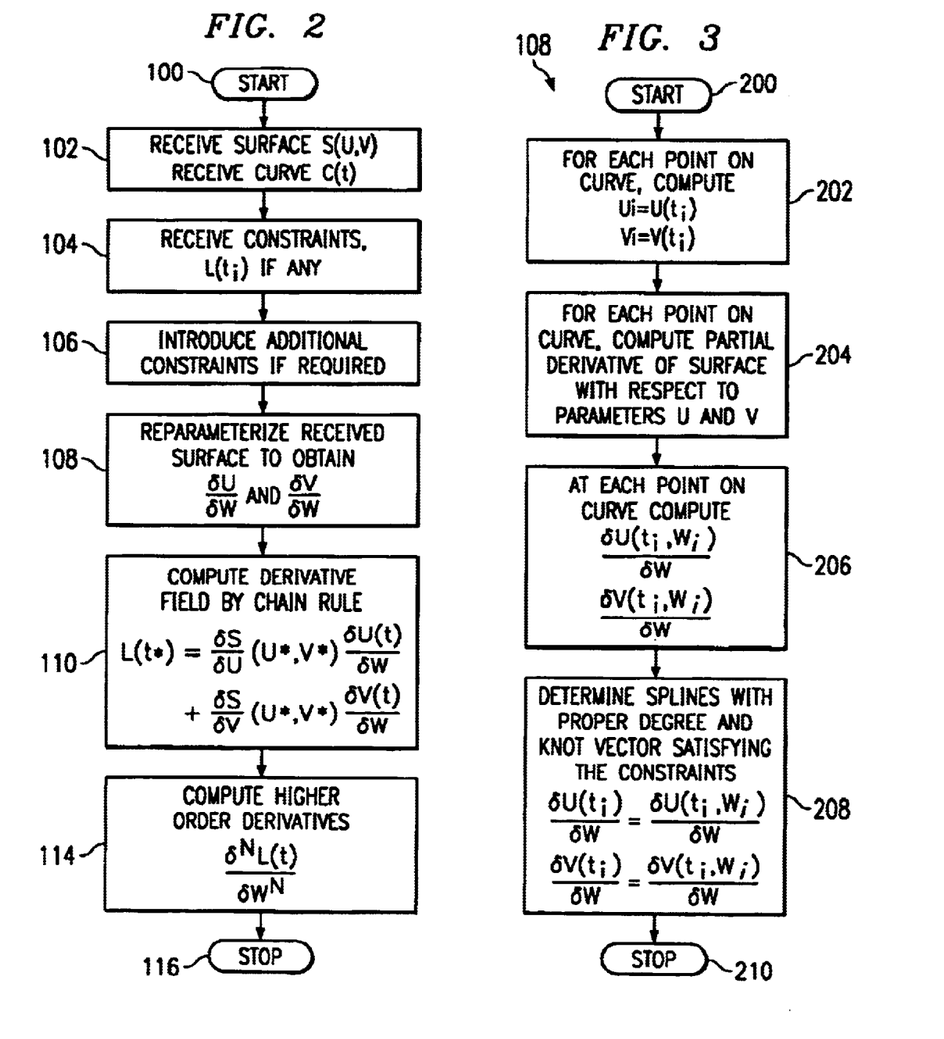
FIG. 2 is a flowchart showing example steps associated with a method for computing a transversal derivative field according to the teachings of the invention.
FIG. 3 is a flowchart showing additional example steps associated with the step of reparameterizing a received surface of FIG. 2.

According to the teachings of the invention, computer modeling software program is operable to compute a transversal derivative field along a curve on a surface as described in greater detail in conjunction with FIGS. 2 and 3.

Figure 1C:
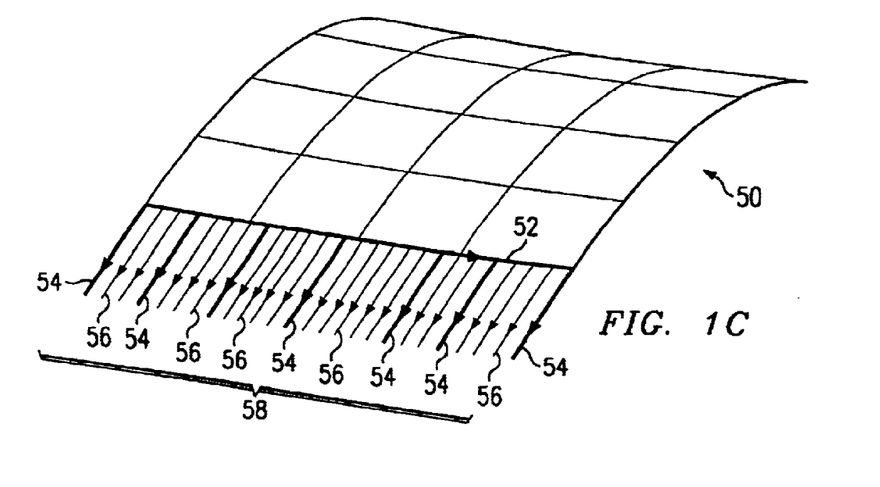
FIG. 1C is a schematic illustration of a transversal derivative field along a curve and a surface generated according to the teachings of the invention.

FIG. 1C is a schematic illustration of a transversal derivative field 58 along a curve 52 on a surface 50. According to the teachings of the invention, transversal derivative field 58 is determined based upon the characteristics of surface 50 and curve 52. Transversal derivative field 58 is also determined based upon a plurality of constraint conditions 54. Transversal derivative field 58 includes a plurality of calculated vectors 56 determined according to the teachings of the invention, as described in greater detail below. The calculated transversal derivative field 58 may be displayed on display 28, stored in memory 34 or storage 40, or otherwise used, such as to generate another surface or curve.

FIG. 2 is a flowchart illustrating example steps associated with computing a transversal derivative field along a curve on a surface, such as transversal derivative field 58. These steps may be performed by computer modeling software program 38. In order to find a better or even optimum solution to the above problem, we make full use of the surface 50 on which curve 52 lies. In this approach, a reparameterization technique is used to compute the derivative field along curve 52 on surface 50. The approach is summarized as follows.

Suppose that surface 50 is smooth and is represented in a NURBS form:

$$S(u, v), \text{ with } u_0 \leq u \leq u_1, \text{ and } v_0 \leq v \leq v_1$$

and its parameterization (u,v) is regular. Suppose also that the curve on the surface is smooth and is represented by $c(t)=S(u(t),v(t))$, with $t_0 \leq t \leq t_1$, and that u(t) and v(t) are differentiable NURBS or functions. The following results are obtained:

First, any of transversal derivative fields 58 (i.e., L(t)) along curve 52 can be expressed as $$L(t) = \frac{\partial S(u(t), v(t))}{\partial u} \frac{\partial u}{\partial w} + \frac{\partial S(u(t), v(t))}{\partial v} \frac{\partial v}{\partial w}. \quad (1)$$

As soon as the scalar function w(u,v) is obtained, the vector field L and all of the higher order derivative fields along the curve can be obtained by differentiating the above equation repeatedly with respect to the vector field L. It should be emphasized that from EQ-1 the derivative field L(t) as defined contains no error as long as smooth function w is provided.

Secondly, the vector field L is obtained by S(u,v), its parameterization (u,v), the parameterized curve c(t), and all of the specified constraint conditions if any. In FIG. 1C, constraint conditions 54 are constraint conditions of the unknown tangent vector field 58. Because the function w(u,v) can be chosen with plenty of freedom, according to one embodiment it is chosen according to the specified situations to obtain the best results. A regular local reparameterization of the surface S(u,v) in the neighborhood of c(t) is constructed for the required vector field L from the given constraints and the parameterization of the curve S(u,v) is constructed for the required vector field L from the given constraints and the parameterizations of both the curve c(t) and the surface S(u,v). More precisely, denoting by (t,w) the new reparameterization of the surface S(u,v), we have from (EQ-1):

$$L(t) = \frac{\partial S(u(t), v(t))}{\partial w} \quad (2)$$

for all t on the curve c(t). From this differential equation, with proper constraint conditions on the vector field L, the parameterization (t,w) of the surface S(u,v) can be obtained. In the computation of w, a "minimal variation" principle is used to produce a simple, smooth and stable reparameterization (t,w). In fact, in one embodiment w is a spline function of t with a proper smoothness determined by a constrained-fitting method to the discrete data points $\{w_i\}$ which in turn are obtained by the following constraint equations (The system may be augmented for shape control and stability if necessary):

$$\frac{\partial S(u(t_i), v(t_i))}{\partial w_i} = L(t_i). \quad (3)$$

More precisely, this system of equations can be written as, for all i=1, 2, ..., N, $$\frac{\partial S(u(t_i), v(t_i))}{\partial u} \frac{\partial u_i}{\partial w} + \frac{\partial S(u(t_i), v(t_i))}{\partial v} \frac{\partial v_i}{\partial w} = L(t_i).$$

Because S(u,v) is smooth and regular, all the values of and $$\frac{\partial u_i}{\partial w} \text{ and } \frac{\partial v_i}{\partial w},$$

for i=1, 2, ..., N, can be obtained:

$$\frac{\partial u_i}{\partial w} = \frac{L(t_i) \times \frac{\partial S(u(t_i), v(t_i))}{\partial v}}{\frac{\partial S(u(t_i), v(t_i))}{\partial u} \times \frac{\partial S(u(t_i), v(t_i))}{\partial v}}, \text{ and}$$

$$\frac{\partial v_i}{\partial w} = \frac{\frac{\partial S(u(t_i), v(t_i))}{\partial u} \times L(t_i)}{\frac{\partial S(u(t_i), v(t_i))}{\partial u} \times \frac{\partial S(u(t_i), v(t_i))}{\partial v}}.$$

From these data values, two interpolatory spline functions, denoted by $$\frac{\partial u}{\partial w} \text{ and } \frac{\partial v}{\partial w}$$

can be computed using a constrained-fitting method with splines to the data sets $$\left\{t_i, \frac{\partial u_i}{\partial w}\right\} \text{ and } \left\{t_i, \frac{\partial v_i}{\partial w}\right\}$$

respectively.

Normally, the degrees of these splines are defaulted to three and the initial knot vectors are defaulted to $\{t_i\}$. Therefore, they are curvature continuous splines. However, if higher order smoothness is required, the degrees of these splines can be larger than three and initial knot vectors can be set to encompass the data set $\{t_i\}$.

It should be noted that from these two spline functions, we can also obtain the following partial derivatives of w(u,v) on the curve c(t):

$$\frac{\partial w}{\partial u} = \frac{\frac{\partial v}{\partial t}}{\Delta},$$

$$\frac{\partial w}{\partial v} = -\frac{\frac{\partial u}{\partial t}}{\Delta},$$

where the symbol $\Delta$ is guaranteed non-zero and defined as $$\Delta = \begin{vmatrix} \frac{\partial u}{\partial w} & \frac{\partial v}{\partial w} \\ \frac{\partial u}{\partial t} & \frac{\partial v}{\partial t} \end{vmatrix}.$$

Therefore, (t, w) is indeed a regular reparameterization of the surface S(u,v) in the neighborhood of the curve c(t).

It is also clear that only the splines, $$\frac{\partial u}{\partial w} \text{ and } \frac{\partial v}{\partial w}$$

are needed to compute the required transversal derivative field L(t). There is no need to evaluate the function w explicitly for this purpose.

All higher order derivative fields can be obtained directly by differentiating equation EQ-2:

$$\frac{\partial L(t)}{\partial w} = \frac{\partial^2 S(u(t), v(t))}{\partial w^2}. \quad (4)$$

One example implementation of the above approach is described with reference to the method of FIG. 2. The method begins at step 100. At a step 102 a surface S(u,v), such as surfaces 50, is received by, for example, computer 14. At step 102 a curve c(t), such as curve 52, is also received. c(t) is a curve that lies on the surface S(u,v). It is often desired in computer modeling to compute a transversal derivative field, such as field 58, along curve c(t) that lies on surface S(u,v). According to one embodiment, surface S(u,v) may be represented in NURBS form. NURBS is an acronym that stands for Non-Uniform Rational B-Splines, which are well known in the art of computer modeling. As defined above the surface of S(u,v) is defined for values of u between $u_o$ and $u_1$, and values of v between $v_o$ and $v_1$. In the below calculations, the NURBS parameterization (u,v) is assumed to be regular; however, the teachings of the invention are also applicable if S(u,v) is not a NURBS surface. In this example, c(t) is equal to S(u(t), v(t)) with $t_0$ less than or equal to t less than or equal to $t_1$. According to one embodiment, u(t) and v(t) may be differentiable NURBS functions.

At a step 104 computer 14 receives constraints for the computed derivative field, if any. The derivative field may be represented by L(t) along the curve. Thus, according to one embodiment, the value of L along the parameter t may be specified at any given number of points. Alternatively, a vector-value of the derivative field could be specified as a constraint condition.

At step 106 additional constraints are introduced. In certain applications some additional constraints are needed to create adjustable vector fields. For example, in the case of sweeping surface construction with higher order continuity requirements, it is desirable to create a transverse vector field that mimics a sweeping effect of some generator curves. In such a case, an appropriate number of additional constraint vectors, $L(t_i)$, are created on the curve c(t) using the "sweeping rule". Such sweeping rules include both pure translation and translation-and-rotation of some given curve (s) or vector(s).

If no special requirements are needed, there is no need to create these additional constraints. However, to optimize the vector field without any special requirement, additional constraints can also be introduced by a default module.

At a step 108, the surface S(u,v) is reparameterized in terms of a scalar function w(u,v). According to the teachings of the invention, proper selection of the scalar function w(u,v) allows optimum and efficient determination of the transversal derivative field L(t). Additional steps associated with reparameterizing surface S(u,v) are described in greater detail below in conjunction with FIG. 3.

At a step 110, the transversal derivative field is computed according to the formula $$L(t^*) = \frac{\partial S}{\partial u}(u^*, v^*) \frac{\partial u(t^*)}{\partial w} + \frac{\partial S}{\partial v}(u^*, v^*) \frac{\partial v(t^*)}{\partial w},$$

where $t^*$ represents discrete values of the parameter t on c(t), $u^*$ equals $u(t^*)$, and $v^*$ equals $v(t^*)$. It should be noted that in this step the scalar function w(t) or w(u,v) does not necessarily have to be obtained. Rather, the partial derivatives with respect to w of u(t,w) and v(t,w) are sufficient. The variables in the above equation are determined in the reparameterization performed at step 108 as described in greater detail in conjunction with FIG. 3. At a step 114 the higher order derivatives of the transversal derivative field L(t) may be calculated as needed. The method concludes at step 116.

Thus according to the teachings of the invention a transversal derivative field along a curve c(t) of the surface S(u,v), can be obtained in an efficient manner by utilizing all available information by performing the reparameterization described at step 108. This approach is believed beneficial because it generates an optimum solution, one that does not require approximation of the transversal derivative field, because it fully utilizes all needed properties of the surface on which the curve lies.

FIG. 3 is a flowchart showing additional example steps associated with step 108 of reparameterizing the received surface S(u,v). The method begins at step 200. At step 202, for each data point on curve c(t), that corresponds to a constraint or an end point, a corresponding $u_i=u(t_i)$ and $v_i=v(t_i)$ are determined, where "$i$" is an index of each data point. At a step 204, for each point on the curve c(t) the partial derivatives of the surface S(u,v) with respect to parameters u and v are calculated. In this regard, the following equations may be used on the curve c(t):

$$\frac{\partial S(u_i, v_i)}{\partial u} = \frac{\partial S(u(t_i), v(t_i))}{\partial u}, \text{ and}$$

$$\frac{\partial S(u_i, v_i)}{\partial v} = \frac{\partial S(u(t_i), v(t_i))}{\partial v}.$$

At a step 206, for each point on the curve a partial derivative of $u(t_i,w_i)$ with respect to the scalar function w and a partial derivative of $v(t_i,w_i)$ with respect to the scalar function w are calculated. This may be determined from the following relationship at the data points:

$$L(t_i) = \frac{\partial S(u(t_i), v(t_i))}{\partial u} \frac{\partial u_i}{\partial w} + \frac{\partial S(u(t_i), v(t_i))}{\partial v} \frac{\partial v_i}{\partial w}.$$

At step 208, two spline functions, $$\frac{\partial u(t)}{\partial w} \text{ and } \frac{\partial v(t)}{\partial w}$$

are determined that have the proper degrees and knot vectors to satisfy the constraints obtained from the above equations:

$$\frac{\partial u(t_i)}{\partial w} = \frac{\partial u_i}{\partial w}, \text{ and}$$

$$\frac{\partial v(t_i)}{\partial w} = \frac{\partial v_i}{\partial w}.$$

$$\frac{\partial u(t)}{\partial w} \text{ and } \frac{\partial v(t)}{\partial w}$$

The degrees and knot vectors of these functions may be selected according to techniques well-known in the art. Normally, the degrees of these splines are defaulted to 3 and the initial knot vectors are defaulted to $\{t_i\}$. Therefore, they are curvature continuous splines. However, if higher order smoothness is required, the degrees of these splines can be greater than three and initial knot vectors can be set to encompass the data set $\{t_i\}$.

Figure 4A:
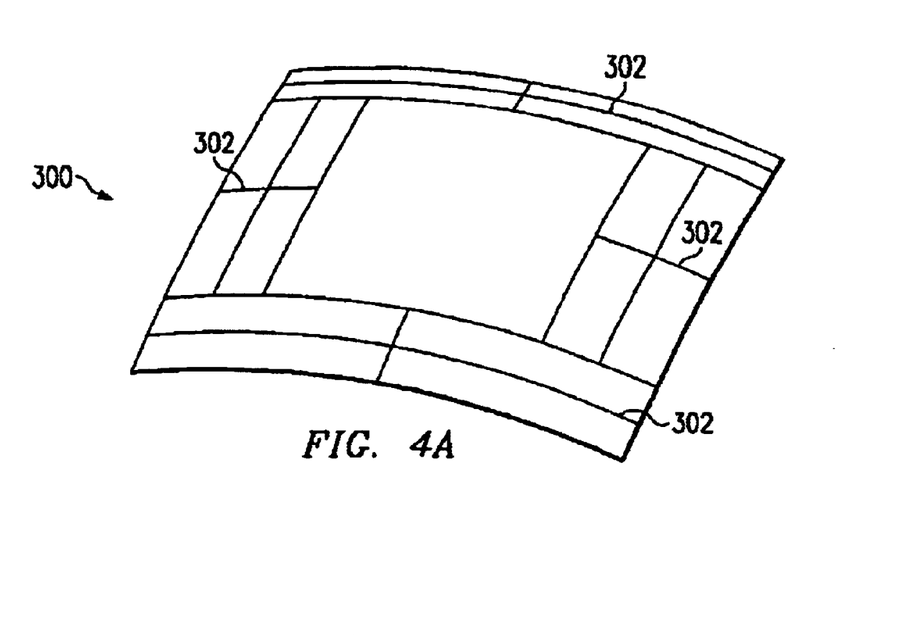
FIGS. 4A and 4B are schematic drawings illustrating four transversal derivative fields calculated according to the teachings of the invention for use in modeling a four-sided hole problem.
Figure 4B:
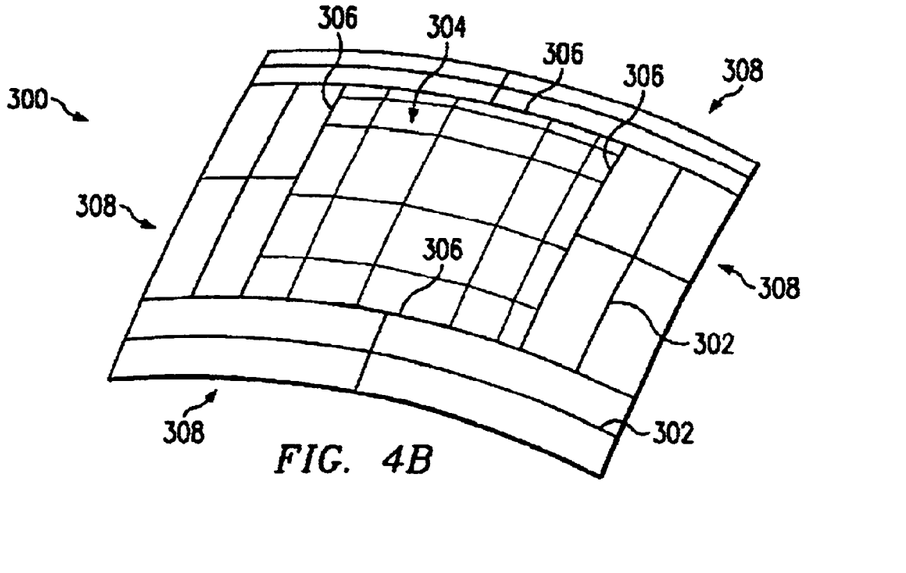

FIGS. 4A and 4B are schematic diagrams illustrating the calculation of four transversal derivative fields on a surface-complex 300 for a four-sided hole problem according to the teachings of the invention. Also illustrated are four sketched control nets 302 for the surface-complex 300. The objective of this problem is to find a NURBS surface filling the hole smoothly with the boundary surfaces. Therefore, on the four boundary curves of the required surface, the transversal derivative fields must match the corresponding transversal derivative fields of the given surfaces. According to the above-described process, transversal derivative fields may be calculated from the given surface-complex 300 and used to construct the required surface. In this example, boundary curves 306 are all iso-parametric curves of bi-quintic spline surfaces and the resulting surface is bi-quintic without any extra knots. In this special case, the surface is $C^2$ with the four boundary surfaces 308 without any error. The control net of the resulting surface, 304, is also shown in the center of FIG. 4B.

Figure 5A:
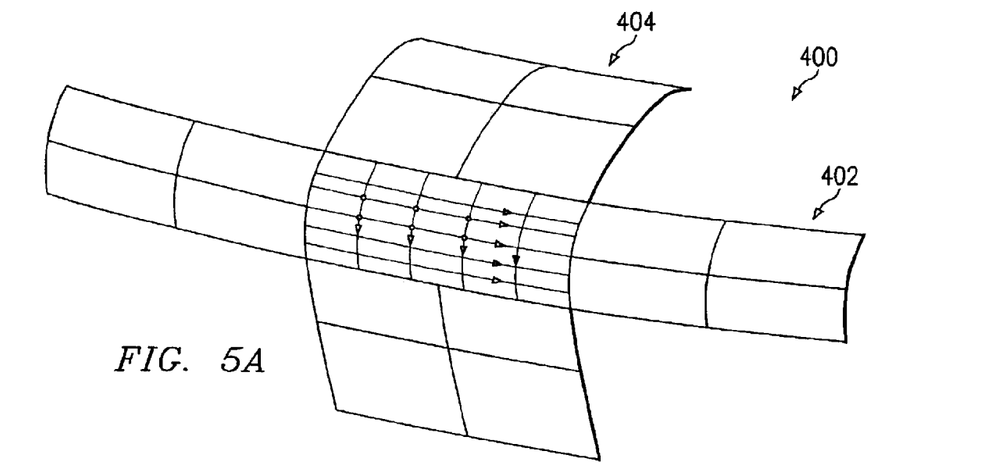
FIGS. 5A–5D are schematic drawings illustrating the determination of four transversal derivative fields for use in modeling a seven by six blending problem.

FIGS. 5A through 5D illustrate the use of the present invention to calculate four transversal derivative fields for solving a seven by six blending problem. In this example, surface-complex 400 comprises spline surface 402 of degrees 5 by 7 and spline surface 404 of degree 5 by 5 respectively. Also, for the top and bottom boundary curves, there are four constraint vectors provided by the tangent vectors of the vertical interior curves at the end points. For the left and right boundary curves, there are five constraint vectors provided by the tangent vectors of the horizontal interior curves at the end points. These curves are also shown in FIG. 5A.

Figure 5B:
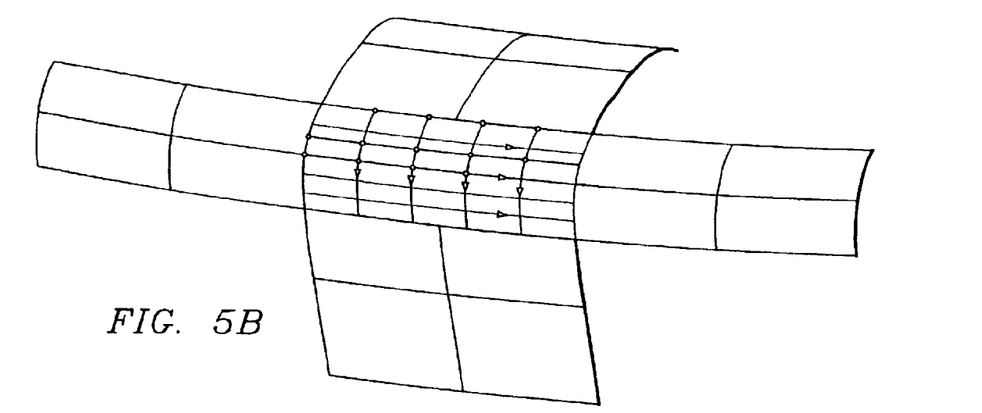
Figure 5C:
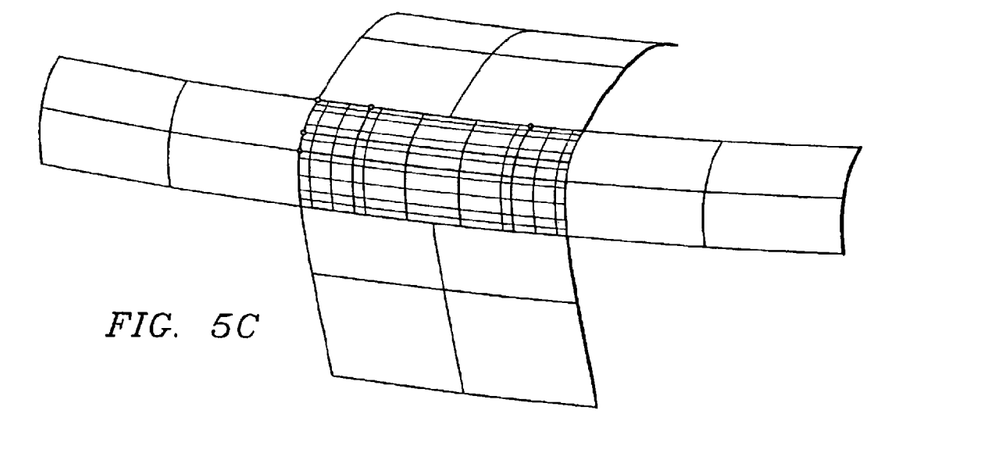
Figure 5D:
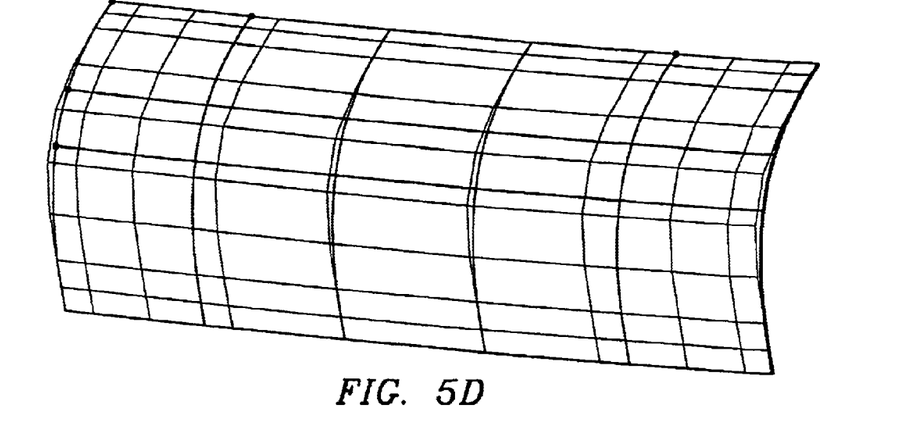

The resulting filling surface and its knots and the interior curves are shown in FIG. 5B. The resulting surface with its knots and control net, and the interior curves are shown in FIG. 5C. The enlarged version of the resulting surface is shown in FIG. 5D.

In this example, the resulting filling surface is of degrees 5 by 7 with two extra knots to accommodate all the interior curves. It is only approximately $C^2$ with the four boundary surfaces within the following tolerances: position 0.001 mm, tangent 0.005 degrees, and absolute curvature value of 0.005.

Figure 6A:
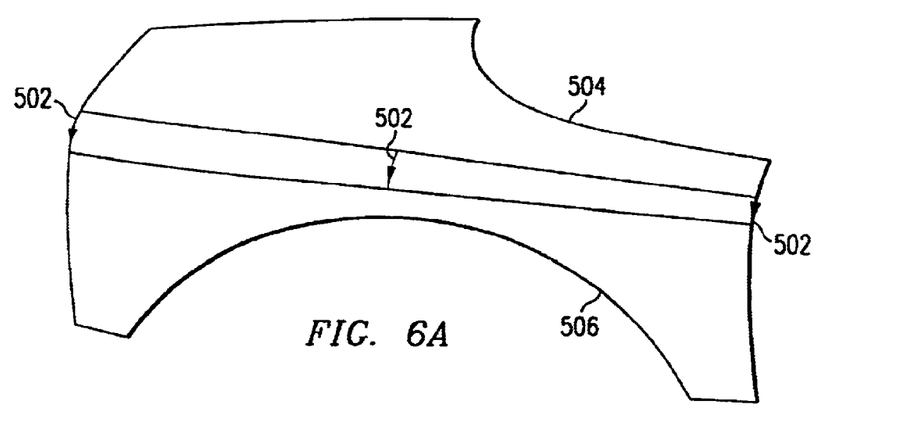
FIGS. 6A–6E are schematic drawings illustrating calculation of two transversal derivative fields according to the teachings of the invention for use in modeling a three by two blending problem with two non-iso-parametric curves.

FIGS. 6A through 6E illustrate generation of transversal derivative fields for use in a three by two smoothing blending problem with two non-iso-parametric curves (top and bottom curves) as illustrated in FIG. 6A. Note that three constraint curves 502 are provided. The top 504 and bottom 506 curves are non-iso-parametric curves on surface and the constraint curves are 3D curves.

Figure 6B:
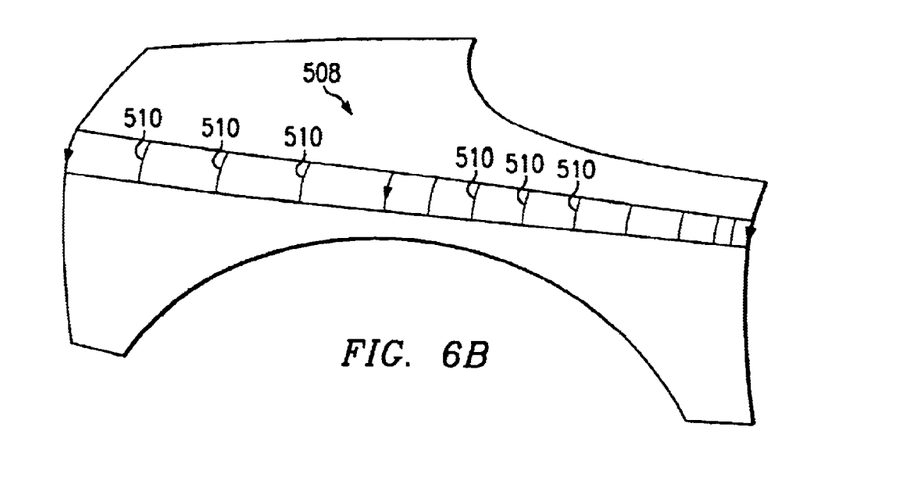
Figure 6C:
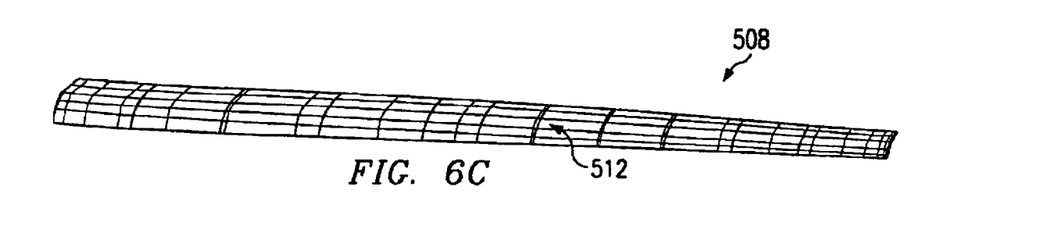
Figure 6D:
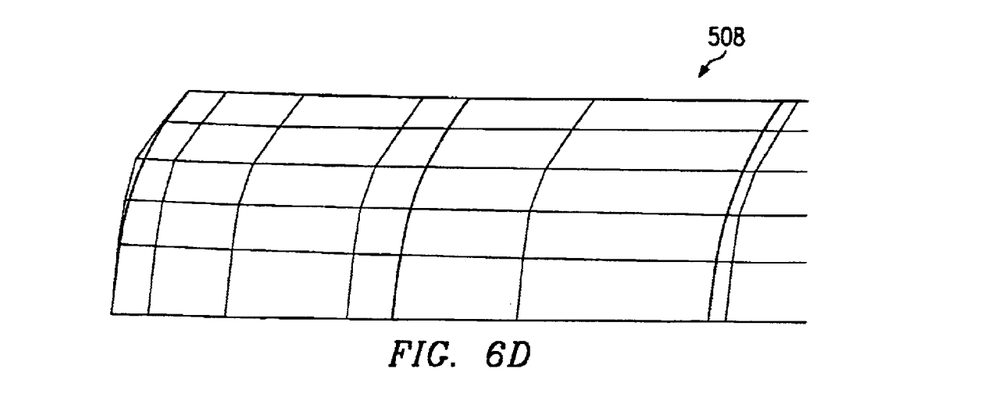
Figure 6E:
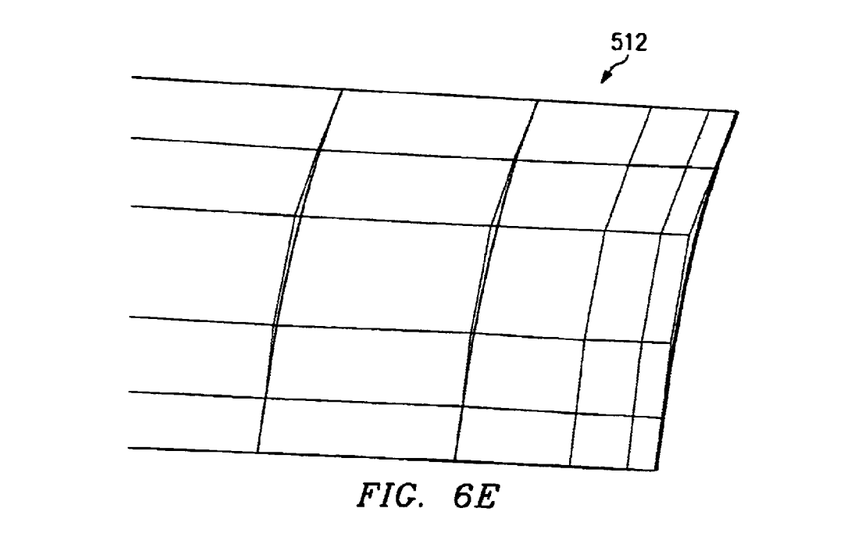

The blending solution surface 508, shown in FIG. 6B with its interior knot lines 510, is constructed with the use of the transversal derivative fields obtained by the invention from the boundary curves and surfaces. The surface 508 and its control net 512 are shown in FIG. 6C. The enlarged versions of the surface and its control net are shown in FIGS. 6D and 6E respectively.

The two non-iso-parametric curves are on spline surfaces with degrees 5 by 7 and the resulting surface is of degrees 5 by 7 with 12 knots to accommodate the interior vector constraints and the non-iso-parametric curves. In this example, the resulting surface is approximately $C^2$ continuous with the boundary surfaces within the following tolerances: position 0.001 mm, tangent 0.005 degrees, and absolute curvature value of 0.005.

It should be noted that in all the examples described here, there are implicit constraints to the required transversal derivative field. More precisely, at the end points of the concerned curves c(t) on which the transversal derivative field is required, the transversal derivative field is constrained by the two tangent vectors of hole boundary curves intersecting c(t). These constraints can be imposed either manually by the user or automatically by the software.

Although the present invention has been described in detail, it should be understood that various changes, substitutions, and alterations can be made hereto without departing from the spirit and scope of the invention as defined by the appended claims.

What is claimed is:

1. A computerized method for computing a transversal derivative field along a curve on a surface comprising:
   receiving data defining the surface, the surface represented in terms of parameters u and v as S(u,v);
   receiving data defining the curve, the curve represented in terms of a parameter t as c(t);
   receiving a number equal to N constraint conditions for the derivative field, wherein N is a positive integer;
   determining a scalar function w(u,v) according to the constraint formula $$L(t_i) = \frac{\partial S(u(t_i), v(t_i))}{\partial w},$$

wherein i is an index identifying a particular one of N numbers of constraint conditions and $L(t_i)$ is the value of the transversal derivative field at the ith constraint condition; and determining by a computer the transversal derivative L(t) field according to the formula $$\frac{\partial S(u(t), v(t))}{\partial w} = L(t).$$

wherein:
u,v, and t are real numbers:
S(u,v), w(u,v), c(t), and L(t) are real value functions; and
u(t) and v(t) are real value functions of the curve parameter t that relate the
parameterization of the curve t and the parameterization of the surface S(u,v).

2. The method of claim 1, and further comprising displaying the transversal derivative field on a computer display.

3. The method of claim 1, and further comprising using the determined transversal derivative field to generate a computer image.

4. The method of claim 1, wherein the scalar function is a NURBS function.

5. The method of claim 4, and further comprising selecting a proper degree and knot vector for the NURBS function.

6. The method of claim 1, wherein the scalar function is a spline.

7. The method of claim 6, and further comprising selecting a proper degree and knot vector for the spline.

8. The method of claim 1, and further comprising computing a derivative of the transversal derivative field with respect to the scalar function for use in generating a computer image.

9. A computerized method for computing a transversal derivative field along a curve on a surface comprising:
receiving data defining the surface, the surface represented in terms of parameters u and v as S(u,v);
receiving data defining the curve, the curve represented in terms of a parameter t as c(t);
receiving a number equal to N constraint conditions for the derivative field, wherein N is a positive integer;
determining by a computer the transversal derivative L(t) field according to the formula $$L(t) = \frac{\partial S(u(t), v(t))}{\partial w},$$

wherein w is any scalar function of either u and v, or t, that satisfies at least N constraint equations:

$$\frac{\partial S(u(t_i), v(t_i))}{\partial w} = L(t_i)$$

where i is an index identifying a particular one of N numbers of the constraint conditions and $L(t_i)$ is the value of the transversal derivative field at the ith constraint; and wherein:
u,v, and t are real numbers;
S(u,v), w(u,v), c(t), and L(t) are real value functions; and
u(t) and v(t) are real value functions of the curve parameter t that relate the
parameterization of the curve t and the parameterization of the surface S(u,v).

10. The method of claim 9, and further comprising displaying the transversal derivative field on a computer display.

11. The method of claim 9, and further comprising using the determined transversal derivative field to generate a computer image.

12. The method of claim 9, wherein the scalar function is a NURBS function.

13. The method of claim 12, and further comprising selecting a proper degree and knot vector for the NURBS function.

14. The method of claim 9, wherein the scalar function is a spline.

15. The method of claim 14, and further comprising selecting a proper degree and knot vector for the spline.

16. The method of claim 9, and further comprising computing a derivative of the transversal derivative field with respect to the scalar function for use in generating a computer image.

17. An apparatus comprising a logic encoded in a computer-readable medium operable, when executed on a processor, to:
receive data defining the surface, the surface represented in terms of parameters u and v as S(u,v);
receive data defining the curve, the curve represented in terms of a parameter t as c(t);
receive a number equal to N constraint conditions for the derivative field, wherein N is a positive integer;
determine the transversal derivative L(t) field according to the formula $$L(t) = \frac{\partial S(u(t), v(t))}{\partial w},$$

wherein w is any scalar function of either u and v, or t, that satisfies at least N constraint equations:

$$\frac{\partial S(u(t_i), v(t_i))}{\partial w} = L(t_i)$$

where i is an index identifying a particular one of N numbers of constraint conditions and $L(t_i)$ is the value of the transversal derivative field at the ith constraint; and wherein:
u,v, and t are real numbers;
S(u,v), w(u,v), c(t), and L(t) are real value functions; and
u(t) and v(t) are real value functions of the curve parameter t that relate the
parameterization of the curve t and the parameterization of the surface S(u,v).

18. The logic of claim 17, wherein the logic is further operable to display the transversal derivative field on a computer display.

19. The logic of claim 17, wherein the logic is further operable to use the determined transversal derivative field to generate a computer image.

20. The logic of claim 17, wherein the scalar function is a NURBS function.

21. The logic of claim 20, wherein the logic is further operable to select a proper degree and knot vector for the NURBS function.

22. The logic of claim 17, wherein the scalar function is a spline.

23. The logic of claim 22, wherein the logic is further operable to select a proper degree and knot vector for the spline.

24. The logic of claim 17, wherein the logic is further operable to compute a derivative of the transversal derivative field with respect to the scalar function for use in generating a computer image.

25. A computer system comprising:
a processor;
a computer-readable medium accessible by the processor;
a computer program encoded on the computer-readable medium operable, when executed on the processor, to:
receive data defining the surface, the surface represented in terms of parameters u and v as S(u,v);
receive data defining the curve, the curve represented in terms of a parameter t as c(t);
receive a number equal to N constraint conditions for the derivative field wherein N is a positive integer;
determine the transversal derivative L(t) field according to the formula $$L(t) = \frac{\partial S(u(t), v(t))}{\partial w},$$

wherein w is any scalar function of either u and v, or t, that satisfies at least N constraint equations:

$$\frac{\partial S(u(t_i), v(t_i))}{\partial w} = L(t_i)$$

where i is an index identifying a particular one of N numbers of constraint conditions and $L(t_i)$ is the value of the transversal derivative field at the ith constraint; and wherein:
u,v, and t are real numbers;
S(u,v), w(u,v), c(t), and L(t) are real value functions; and
u(t) and v(t) are real value functions of the curve parameter t that relate the
parameterization of the curve t and the parameterization of the surface S(u,v).

26. The computer system of claim 25, wherein the computer program is further operable to display the transversal derivative field on a computer display.

27. The computer system of claim 25, wherein the computer program is further operable to use the determined transversal derivative field to generate a computer image.

28. The computer system of claim 25, wherein the scalar function is a NURBS function.

29. The computer system of claim 25, wherein the scalar function is a spline.

30. The computer system of claim 29, wherein the computer program is further operable to select a proper degree and knot vector for the spline.

31. The computer system of claim 25, wherein the computer program is further operable to compute a derivative of the transversal derivative field with respect to the scalar function for use in generating a computer image.

* * * * *